United States Patent
Affentranger (10) Patent No.: US 11,421,814 B2
(45) Date of Patent: Aug. 23, 2022

(54) PORTABLE STAND FOR PORTABLE ELECTRONIC DEVICES

(71) Applicant: Beat Affentranger, Horw (CH)

(72) Inventor: Beat Affentranger, Horw (CH)

( * ) Notice: Subject to any disclaimer, the term of this patent is extended or adjusted under 35 U.S.C. 154(b) by 0 days.

(21) Appl. No.: 17/053,141

(22) PCT Filed: May 9, 2019

(86) PCT No.: PCT/EP2019/061908
§ 371 (c)(1),
(2) Date: Nov. 5, 2020

(87) PCT Pub. No.: WO2019/219493
PCT Pub. Date: Nov. 12, 2019

(65) Prior Publication Data
US 2021/0247016 A1    Aug. 12, 2021

(30) Foreign Application Priority Data
May 15, 2018 (EP) .................................. 18172382

(51) Int. Cl.
*F16M 11/10*    (2006.01)
*F16M 11/04*    (2006.01)
*F16M 11/20*    (2006.01)

(52) U.S. Cl.
CPC ........... *F16M 11/10* (2013.01); *F16M 11/041* (2013.01); *F16M 11/2014* (2013.01); *F16M 2200/027* (2013.01)

(58) Field of Classification Search
CPC .. F16M 11/041; F16M 11/10; F16M 11/2021; F16M 2200/041; A47B 23/007; A47B 23/04; A47B 23/042; A47B 23/044
See application file for complete search history.

(56) References Cited

U.S. PATENT DOCUMENTS 5,458,312 A * 10/1995 Goldberg ............. A47B 23/007
248/444.1
5,720,465 A *  2/1998 Peltzer .................. A47B 23/007
248/453

(Continued)

FOREIGN PATENT DOCUMENTS

EP        1860366        11/2007

*Primary Examiner* — Bradley Duckworth
(74) *Attorney, Agent, or Firm* — DeFillo & Associates, Inc.; Evelyn DeFillo (57) ABSTRACT

The present invention relates to a portable and tiltable stand (1) for multiple portable electronic devices with a screen (2) that allows the screens to be looked at also upwards from lower position. The stand (1) includes a base (3), a tray (4) with a fixation device (5) suitable to attach the electronic device or devises (2) to the tray (4) reversibly, and one or more torque joints (6), wherein at least one torque joint (6) is in the form of a torque hinge (6a), ball joint, condyloid joint and/or saddle joint, through which the tray (4) is connected to the base (3). The one or more torque joints (6) allow the tray (4) to be tilted by at least an angle of ±30°, preferably at least ±45°, starting from the 90° upwards position relative to the base (3), and have a torque to allow the tray (4) with an attached electronic device (2) to remain in any position, and to tilt the tray (4) with the attached electronic device or devices (2) by hand without having to loosen and tighten an adjustable screw or the like.

Also includes the use of the stand (1).

12 Claims, 5 Drawing Sheets

(56) References Cited

U.S. PATENT DOCUMENTS

| | | | |
|---|---|---|---|
| 7,938,372 B2* | 5/2011 | MacLeod | A47B 21/00 248/122.1 |
| 8,235,334 B1 | 8/2012 | Kobal | |
| 9,027,900 B2* | 5/2015 | Prohofsky | F16M 11/38 248/462 |
| 9,377,156 B2* | 6/2016 | Wong | F16M 11/2092 |
| 9,470,356 B1* | 10/2016 | Zaloom | A47B 23/04 |
| 9,856,895 B2* | 1/2018 | Kieley | F16M 13/022 |
| 11,020,647 B2* | 6/2021 | Sierra Murillo | F16M 13/022 |
| 2005/0188899 A1* | 9/2005 | Yovich | A47B 23/002 108/10 |
| 2006/0158836 A1* | 7/2006 | Phillips | A47C 7/727 361/679.22 |
| 2007/0012827 A1* | 1/2007 | Fu | F16M 11/10 248/163.1 |
| 2007/0120034 A1 | 5/2007 | Sparling | |
| 2012/0273630 A1* | 11/2012 | Gillespie-Brown | F16M 11/10 248/122.1 |
| 2013/0193174 A1 | 8/2013 | Ackeret | |
| 2013/0206935 A1 | 8/2013 | Duncan | |
| 2014/0265752 A1* | 9/2014 | Caine | A47C 21/003 312/7.2 |
| 2015/0124385 A1* | 5/2015 | Mak | F16M 13/04 361/679.03 |
| 2015/0346774 A1* | 12/2015 | Marquardt | F21V 33/0048 362/253 |

* cited by examiner

PORTABLE STAND FOR PORTABLE ELECTRONIC DEVICES

CROSS REFERENCE TO RELATED APPLICATION

This application is a national stage entry of PCT/EP2019/061908 filed May 9, 2019, under the International Convention and claiming priority over European Patent Application No. 18172382.6 filed May 15, 2018.

FIELD OF THE INVENTION

The present invention relates to a portable and tiltable stand for a portable electronic device with a screen that allows the screen to be looked at also upwards from lower position, and to its use.

PRIOR ART

In recent years, portable electronic devices with a screen, such as smartphones, tablets and e-readers, have become increasingly popular. Due to their versatility, users can, for example, easily read books and news, write emails, watch videos or TV as well as communicate with others through modern communication means such as social media or video telephony etc.—all with one and the same device. Therefore, such electronic devices have become almost ubiquitous and are widely used by people of all ages.

Portable electronic devices are flat rectangular computers with a screen and one or more built in cameras, they are commonly referred to as tablet computers, tablets, pads, 2-in-1 devices, e-book readers, phablets, smartphones. Due to their ever-growing versatility and the fast, mobile internet connections now also available, such portable electronic devices have become tremendously popular in recent years. They are used, for instance, to browse and interact with webpages, read books and news, write and receive emails, watch TV and films, make and exchange photographs and video clips, and for life communication with social media, and for telephony including video telephony. In short, they have become almost ubiquitous and are widely and frequently used by people of all ages, for a wide and ever-growing range of purposes in all sorts of situations, both domestic and professional.

This large-scale use of portable electronic devices has been complemented with an extensive range of available accessory products such as peripherals, sleeves, protection cases, and holding appliances. In principle, devices of this kind can be—and indeed often are—handheld. But there are many situations in which handheld use is not desirable or not even possible, at least not for along period of time. Hence the need for holding appliances or 'stands' as they shall be called henceforth.

Most of the stands available are designed for a posture in which the user looks at the screen in a hunched down position from an angle above. The present invention has been spurred by the realization that there is no satisfactory stand that allows a person to use a portable electronic device in a hands-free manner when in a reclined or supine position. Yet the need for such a stand is acute not only in the domestic area but particularly also in medical and health care institutions and nursing homes for the elderly, i.e. places where many people are compelled to spend much of their time lying in bed. But when people need to go to such institutions, they will want to continue using their own personal electronic devices. Given that such devices are used by ever more people in ever more situations and that the first generation of users that got accustomed—not to say addicted—to such devices is around retirement age, it is safe to say that the demand for such a holding appliance will increase.

But how or in what position is one to hold such a device? The question is particularly relevant when the device is used, which is often the case, for a longer period. The answer seems to be: from an angle above. Irrespective of whether they are on a sofa, sitting at a table or in an armchair, or are lying in bed etc., people usually lean forwards slightly and tilt their heads downwards when looking at the screen of their devices. And indeed, virtually all tablet holders and stands on the market support or even presuppose such a viewing posture. However, this posture is far from ideal. Remaining in such a hunched down position puts extra strain on the muscles involved and may result in neck pain or worse; and it can get very uncomfortable after a while. Yet the alternatives are limited. If a person wants to recline or lie on the back, they have to raise the device above the head, and—with the arms outstretched—they have to hold it there at an angle to the eyes, which is not a position that can be maintained for long even with alight device such as a smartphone.

Therefore, there is a need for an appliance that allows for one or more portable electronic devices to be mounted easily, reversibly and independent of their size and make, whereby the appliance must enable the electronic devices to be tilted easily in a manner that allows the screens of the portable devices to be looked at and interacted with also upwards from a lower position, even for an extended period of time. The need for such an appliance is acute particularly also in hospitals, nursing homes, and other places where people are compelled to spend much or all of their time in a lying or reclined position. Furthermore, the sought for appliance must be easy and safe to use, i.e. electronic devices must be easily fixed, tilted and adjusted, removed as well as changed, without undue burden and safety hazard. The appliance must be self-supporting and not become an obstacle, in particular when a user wants to get up or change his position. In addition, it is a must that the appliance is highly versatile in its manifold uses, in and outside buildings without limitations. And since a lot of people use more than one electronic device, e.g. a tablet computer and a smartphone, it is an asset if the appliance optionally can receive more than one electronic device at the same time and for different uses.

SUMMARY OF THE INVENTION

Surprisingly, it was found that this highly complex object can be solved by a portable and tiltable stand (1) in the form of a portable table stand (1a), floor stand (1b), or integrated stand (1c) for portable electronic devices with a screen (2) that allows the screen or screens to be looked at also upwards from a lower position, comprising of abase (3), a tray (4) with fixation means (5) suitable to attach one or more electronic device or devices (2) to the tray (4) reversibly, wherein the tray (4) is connected to the base (3) through one or more torque joints (6), wherein at least one torque joint (6) is in the form of a torque hinge (6a), ball joint, condyloid joint and/or saddle joint, thus allowing the tray (4) to be tilted by at least an angle of ±30°, preferably at least ±45°, starting from the 90° upwards position relative to the base (3), and have a torque to allow the tray (4) with an attached electronic device (2) to remain in any position, and to tilt the tray (4) with the attached electronic device (2) by hand without having to loosen and tighten an adjustable screw or the like, wherein the tray (4), when the stand (1) is in the form of the portable floor stand (1b), is comprising of a multitude, i.e. 10 or more, of openings to fix the fixation means (5) to the tray (4) to adjust the place of the fixation means (5) for suitable electronic devices to be attached to the tray (4).

Claimed also is the use of the portable stand (1) according to the invention by a person who is looking at the screens of the device or devices (2) from an angle below, wherein the tray (4) with the device or devices (2) is tilted into an overhanging position allowing for optimal and relaxed viewing of the screen, in particular when the person is in a reclined or supine position sitting/lying in an armchair, an armchair bag, a bean bag, on a sofa, a bed, a mattress, a deck-chair, a bench, a futon, in a bath tub, or on the floor.

Furthermore, claimed is also the use of the portable stand (1) according to the invention as a holdfast and/or swivel appliance for the electronic device or devices (2) when making photographic images and/or film exposures with the camera of the electronic device (2) or devices.

BRIEF DESCRIPTION OF THE DRAWINGS

The following figures present non-limiting embodiments, which are not restricting or narrowing the invention. These explanations are part of the description.

DETAILED DESCRIPTION OF THE INVENTION

The portable and tiltable stand (1) of the present invention and its use has surprisingly many advantages. The stand (1) can easily be turned, or repositioned, which results in a high degree of freedom in the ways in which the exact position of the screen or screens can be optimized, especially—but not exclusively—when looked at horizontally or upwards from lower position. Surprisingly, the tray (4) can be tilted easily within a very broad range—by at least an angle of ±30°, preferably at least ±45° or even ±75° or more, starting from the 90° upwards position relative to the base (3). Thus, the tray (4)—e.g. with the device or devices (2) attached to it—cannot only be placed into an overhanging position suitable for a person to view the screens optimally from below, the tray (4) can also be tilted back, so that the tray (4) gets positioned over the base (3) of the stand (1). In this folded-back position, the screens of the devices (2) can be viewed also from a conventional reading-position, i.e. from an angel above, or, if the person is done with reading/watching, the stand (1) can be easily removed and stowed away without it taking up too much space. When an optional pivot joint (6b) is employed, the tray (4) and thus the device or devices (2) can be easily rotated. Thus, the torque joint or joints (6) allow an easy, straight forward adjustment of the device or devices (2) according to the individuals need, although sufficient resistance exists to remain in position upon using the touch screen of the device or devises (2).

Due to the fact that the tray (4) is connected to the base (3) through one or more torque joints (6), the tray (4) with the attached device or devices (2) can be tilted and optionally rotated easily by hand. Once the tray (4) with the devices (2) is placed at the desired position, the tray (4) with the devices (2) remains at that position, i.e. it will not tilt downward further due to gravity. As a conclusion thereof, the devices with the screen (2) can be adjusted easily to any position requested by the person looking at the screens—even if the person is in a reclined or horizontal position for an extended period of time. Thus, the devices (2)—still in stable position—may face downwards and away from the base (3). Hence, the stand (1) has an extended tilting range that allows the devices to be tilted into a position that is suitable for the screens of the devices (2) to be viewed also from an angle below.

Furthermore, it was surprisingly found that due to the fixation means (5), basically any portable electronic devices (2) with a screen can be fixed, tilted, adjusted, changed and removed easily and reversibly to and from the tray (4) of the stand (1). Hence the stand (1) is not limited to one specific device (2). It is also a big asset that more than one electronic device (2), e.g. two or even more, can, independent of their make or size, be attached simultaneously, individually, and reversibly to the tray (4)—and thus to the stand (1). Each device (2) can e.g. be arranged on the tray (4) to leave sufficient free space for the various ports such as USB-ports or the camera, in particular the rear camera, if required.

Additionally, it was surprisingly found that the device or devices (2) can most typically be mounted on either side of the tray (4), i.e. front or verso, increasing further the versatility of the stand (1). And even more, it is possible to attach on both sides of the tray (4) one or more devices (2), which may be of particular relevance e.g. in a meeting or an exhibition to allow the audience from both sides of the tray (4) to watch the same presentation.

The stand (1) according to the invention is self-supporting and is designed not to become an obstacle, e.g. when a user wants to get up or change his position. The stand (1) can be used widely, not only in nursing homes and other places where people are compelled to spend much or all of their time in a lying or reclined position, but also in domestic contexts where the stand (1), too, can be used in a reclined or supine position—or even e.g. as a stand (1) in the kitchen or the living room when the screen of the device (2) is viewed horizontally of from an angle above. Thus, the stand (1) is highly versatile and can be used widely in and around buildings without limitations.

In addition, it is a distinct asset that the electronic device or devices (2)—when attached to the tray (4)—can have their center of gravity beyond the base (3) of the stand (1).

Thus, it is possible that the table stand (1a) can e.g. be placed next to a table, and a person can look at the screen also upward when being next to the table. Additionally, it is also possible to place the floor stand (1b) next to bed or a sofa that has no empty space or clearance underneath.

The EP-A-1 860 366 discloses a monitor stand comprising of—among others—a base, a stand body supported by the base, a stand top assembly pivotably supported by the stand body, an upper hinge assembly provided with a rotating shaft for pivotably connecting the stand body to the stand top assembly, and a top slide for sliding along the stand top assembly and having a monitor mounted thereon. The monitor is a conventional computer monitor with a stand, i.e. the monitor is not a portable electronic device according to the invention. Furthermore, the stand is not designed to receive portable electronic devices reversibly. Additionally, the stand top assembly, at which the monitor can be attached to, cannot be tilted by at least an angle of ±45° starting from the 90° upwards position relative to the base. Hence, the monitor stand does not allow the monitor to be looked at also upwards from a lower position and does therefore not serve the purpose at hand, however sophisticated it may be in other respects. Additionally, the monitor stand is not capable of receiving 2 or more electronic devices simultaneously.

The US-A-2013/0193174 discloses a device for attaching a tablet computer to the rear-side of a motor vehicle seat encompassing a support for receiving the tablet computer. The support can be moved between a first position, in which the screen of the tablet computer is arranged on the side opposite the vehicle seat and aligned essentially vertically, and a second user position, in which the screen is oriented upwards and essentially horizontally or oblique. As such, the device cannot be brought into a position so that the screen of the tablet computer can be looked at also upwards from a lower position. Hence, the device and the attached tablet computer cannot be tilted by at least an angle of ±30°, in particular not ±45° starting from the 90° upwards position relative to the base. Furthermore, in order to use the support, it must be fixed to a vehicle seat by means of a fastening device. Though fastening devices for the use of the support outside of a vehicle are disclosed, too, the resulting embodiments suffer from the same shortcomings that have already been mentioned, i.e. the screen of the tablet computer is always oriented upwards, vertically at the most. Additionally, the rear camera of the single device may well be hidden by the receptacle and thus cannot be used.

The US-A-2013/0206935 discloses an adjustable electronic device holding apparatus which includes a base assembly, a vertical support member, an arm member, and an electronic device holding assembly. The apparatus can hold an electronic device hands-free, such as for holding an iPad, Kindle®, an e-reader, or another similar handheld electronic device. It is, however, silent about torque hinges, table stands, as well as an electronic device holding assembly capable of receiving 2 or more electronic devices simultaneously. Additionally, a rear camera of the electronic device may well be hidden by the holding assembly and thus cannot be used.

The U.S. Pat. No. 8,235,334 discloses a foldable support for a tablet computer in the form of an upright, self-standing, or anchorable device. The base, having foldout wings, is adapted to be rotated in place and anchored under the legs of a person in a seated position, or under the person's torso for a reclining or supine person. The support includes a body, two arms, and a receptacle holding the tablet computer. The two arms are rotatably pinned together with the other ends attached to ball joints on the body. The support does not stand by itself since it requires fixation by a person's torso or legs. Torque hinges are, however, not mentioned, and the disclosure is also silent about table stands as well as a receptacle capable of receiving 2 or more electronic devices simultaneously. Additionally, a rear camera of the electronic device may well be hidden by the receptacle and thus cannot be used.

The US-A-2007/0120034 reveals a system and method for using a book/laptop stand. It discloses a 'short stand' or 'tall stand', and a mounting deck. The mounting deck comprises of a variously x-shaped mounting platform, a mounting platform coupler, slide clamps, and slide clamp slots. The mounting platform can both rotate and swivel 360°. In the form of the short stand, the system resembles the frame of a simple abdominal trainer and relies on short stand components in the form of parallel legs, which, however, may lead to instability of the system and inconvenience for the user when e.g. placed on a narrow bed or sofa, or when the user, lying in between the supporting legs, has to get out of bed and thus needs to crawl out from underneath the frame or reposition it entirely. The same provisos apply basically the tall stand. In addition, the tall stand, which is intended to be placed on the floor next to a sofa or a bed, relies for stability on a base that needs to be in part placed underneath the sofa or the bed. The system can therefore not be used in combination with a bed or a sofa that has no clearance underneath. Furthermore, torque hinges are not mentioned, and the disclosure is also silent about table stands as well as about a mounting platform capable of receiving 2 or more electronic devices simultaneously. Additionally, a rear camera of the electronic device may well be hidden by the mounting platform and thus cannot be used or only with specific devices. Thus, the tray is inflexible and can receive only one device at the same time and only within a limited size range.

The Stand (1), the Devices (2) and the Base (3)

The stand (1) of the present invention is a portable and tiltable stand (1). The stand (1) is comprising of the base (3), the tray (4), the fixation means (5) suitable to attach one or more electronic devices (2) to the tray (4) reversibly, and one or more torque joints (6). At least one torque joint (6) is in the form of a torque hinge (6a), ball joint, condyloid joint and/or saddle joint, wherein the torque hinge (6a) is preferred. Optionally, one or more pivot joints (6b) may be present as well. The tray (4) is connected to the base (3) through one or more torque joints (6), in particular torque hinge or hinges (6a), wherein the optional pivot joint (6b) may be in-between.

The stand (1) is a portable stand (1), wherein the term "portable" means that an adult person can easily carry the stand (1)—or the tray (4) of the stand (1), in case the tray (4) and the base (3) are detachable from each other—and position the stand (1) or the detachable tray (4) somewhere else, e.g. in another room of a building. Thus, most typically, the stand (1)—when the stand (1) is a portable floor stand (1b)—has a weight of about 15 kg or less, and—when the stand (1) is a portable table stand (1a)—of about 5 kg or less.

The stand (1) is suitable to affix reversibly one or more portable electronic devices (2) with the fixation means (5) to the tray (4) and thus to the stand (1). Therefore, the devices (2) themselves are—when affixed to the tray (4)—tiltable in the same manner as the tray (4). Therefore, the stand (1) is suitable to hold, tilt, and optionally rotate portable electronic devices (2) in such a manner that allows the screens to be looked at also upwards from basically any lower position. Hence, the stand (1) has an extended tilting range that allows the devices to be tilted into a position that is suitable for the screens of the devices (2) to be viewed also from an angle below.

The portable electronic devices with a screen (2) suitable to be affixed reversibly to the tray (4) of the stand (1) according to the invention may be basically any portable electronic device with a screen, wherein the screen covers most typically at least 50% of the surface of the device (2) on which the screen is located. Most typically, they are flat rectangular computers with a screen and optionally one or more built in cameras. Commonly, they are referred to as tablet computers, tablets, pads, 2-in-1 devices, e-book readers, phablets or smartphones. They have a screen with a diagonal of approximately 5 to 14 inches, a depth of up to about 15 mm, and they weigh typically less than 2 kg, in particular less than 1 kg. In general, they consist only of one block into which the screen, usually touch-sensitive, is integrated. The user interacts with such devices in various ways: by touch, with gestures, via the few physically integrated control buttons, with an electronic pen, or via optional peripherals such as a keypad, a mouse, or a headset. Peripherals are usually connected to the device wirelessly. If they are connected physically, they can easily be detached, e.g. by simply unplugging them or by releasing a magnetic snap-fit or the like. But some of these devices have a non-detachable keyboard that can be folded back to the verso of the device. Hence, the devices (2) according to the invention are portable, and as such they can be operated independent of another appliance such as a computer monitor or an electrical outlet. Preferred, non-limiting examples of suitable devices (2) include tablet computers, iPads, smartphones, notebooks, and/or e-book readers.

Mere computer monitors, i.e. monitors with a stand designed to connect to computers, are not considered as electronic devices with a screen (2) according to the invention.

The stand (1) according to the invention is a tiltable stand (1) which is optionally also rotatable around a vertical axis. The term "tiltable" means that the tray (4), which is connected to the base (3) via one or more torque joints (6), preferably torque hinges (6a), can be tilted by at least an angle of ±30°, preferably at least ±45°, in particular of at least ±60° and most preferably of at least ±75°, starting from the 90° upwards position relative to the base (3). Thus—in a preferred embodiment—the center of gravity of the portable electronic device (2) can be, i.e. is allowed to be, beyond the base (3), when the device (2) is attached to the tray (4) with the fixation means (5) and when the tray (4) is entirely tilted.

In a preferred embodiment, the base (3) and the tray (4) are connected to each other non-detachably or detachably, i.e. detachably in a reversible manner. Thus, the tray (4) of the stand (1) may be non-detachable or detachable from the rest of the stand (1). When the tray (4) is detachable, the base (3) is i) a separate, portable base (3) or ii) it is integrated in a piece of furniture, such as a bed, a sofa, a sideboard, a table or bed-side table; a piece of equipment, such as hospital equipment like a bed or medical apparatus; or a construction element of a building, such as a wall, in particular a wall adjacent to a bed or sofa.

When the tray (4) is detachable, trays (4) of different sizes for different devices (2) can be used with one and the same base (3), provided the base (3) is heavy and sturdy enough. Furthermore, the tray (4) can be removed and used in another location together with another base (3), and/or, if the stand (1) is an integrated stand (1c) with for instance a bed dining table as its base (3), the tray (4) can be removed, so that the tray (4) does not interfere with the use of the base (3), i.e. the bed dining table, for its originally intended purpose.

When the stand (1) is a detachable stand, i.e. when the base (3) and the tray (4) can be disconnected reversibly, the one or more torque joints (6), such as the torque hinge or hinges (6a) and the optional pivot joint (6b), may be fixed either to the base (3) and/or to the tray (4).

When the tray (4) is detachable from the base (3), suitable means to detach and attach the tray (4) from and to the base (3) via the one or more torque joints (6) include one or more i) plug connections, ii) clamps, iii) hook-and-loop fasteners, iv) magnets, v) suction cups, and/or vi) screws. These means are commercially available, and the skilled person can make the proper selection.

The portable stand (1) according to the invention is in the form of i) a portable table stand (1a), ii) a portable floor stand (1b), or iii) an integrated stand (1c). Hence, the stand (1) can be adapted to a surprisingly large number of different embodiments and can thus be widely employed in ways not limited to e.g. a table stand only.

When the stand (1) is in the form of
i) a portable table stand (1a) or a portable floor stand (1b), the center of mass of the table stand (1a) is in, below, or over the base (3), even when the tray (4) has its largest deflection against the base (3) and when an electronic device (2) is attached to the tray (4),
ii) a portable floor stand (1b), the base (3) is comprising of a foot (3c), a mast (3b) and a side arm (3a) that is preferably adjustable in height and—preferably fully—rotatable, e.g. via a pivot joint (6b), around the vertical axis of the mast (3b), and wherein the torque joint or joints (6) with the tray (4) is pivotably connected to the side arm (3a) directly or through means which allow the removal of the torque joint or joints (6) from the side arm reversibly, or
iii) an integrated stand (1c), the tray (4) is attached to the base (3), the base (3) is integrated in or is comprising of i) a piece of furniture such as a table, sofa, chair, bookstand, a floor and/or task lamp; ii) a piece of hospital equipment like e bed or the fixture of a medical apparatus; and/or iii) a construction element of a building, such as a wall, in particular a wall adjacent to a bed or sofa; wherein the base (3) may comprise a swivel arm, a pull-out arm and/or a tabletop, and wherein the torque joint or joints (6) are attached to the tray (4) and/or the base (3). Most preferably, the tray (4) is detachable from the base (3) and thus attached reversibly to the base (3).

The term "largest deflection" is understood—according to the present invention—to mean that the tray (4) is tilted by up to 270°, in particular 180° relative to the base (3), or less than 180° if the torque hinges and/or the tray (4) are—e.g. for safety and/or ergonomic reasons—equipped with a mechanical stop that limits the deflection, e.g. to 150°. The base (3) may be of heavy, thick steel and/or comprise of a flat base (3.1), a weight (3.2) and optionally a handle. The required heaviness of the base (3) depends—among others—on the size and geometry of the base (3), the heaviness, size and center of gravity of the tray (4) with the device (2), and on the highest possible tilting angle that puts most strain on the one or more torque joints (6). The skilled person in the art knows how to adjust the center of mass properly, so that it is always in, below, or over the base (3), e.g. by simple experimentation and by increasing the weight and/or adjusting the size of the base (3).

When the stand (1) is in the form of a portable table stand (1a), the base (3) and the tray (4) are preferably linked directly with each other through one or more torque joints (6). As such, the base (3) may be one single element. Alternatively, or in combination, the base (3) is preferably comprising essentially of a flat base (3.1) and a weight (3.2), wherein the weight (3.2) can be placed onto the flat base (3.1) or is an integral part of the base (3.1). Additionally, the base (3) of the portable table stand (1a) may also comprise a handle by means of which the portable table stand (1a) may easily be grasped and carried around.

The portable floor stand (1b) combines the function of the portable table stand (1a) with e.g. a side-table, bed-side table, bed dining table, and/or over-bed table. As such, the floor stand (1b) may be used as the table stand (1a). Furthermore, the portable floor stand (1b) is comprising of a multitude, i.e. 10 or more, preferably 30 or more, in particular 60 or more, of openings to fix the fixation means (5) to the tray (4) to adjust the place of the fixation means (5) for suitable electronic devices to be attached to the tray (4).

The mast (3b) of the portable floor stand (1b) is preferably a vertical mast (3b) and the side arm (3a) is typically a horizontal side arm (3a). Furthermore, the side arm (3b) is preferably connected to the mast (3b) via a glider that allows the side arm (3a) to be adjusted in height easily.

The side arm (3a) is preferably rotatable, e.g. up to 360°, around the vertical axis of the mast (3) against a slight torque that is produced by the one or more pivot joints (6b) that connect the arm (3a) with the mast (3b) and/or the mast (3b) with the foot (3). This allows the user to push the side arm (3a) with the tray (4) out of the way when, for instance, standing up from a sofa, without having to move or reposition the foot (3c). The foot (3c), which may comprise a vertical shaft or the like to support the mast and damp vibrations emanating from the use of the device (2). is dimensioned to hold the floor stand (1b) in an upright position, irrespective of the deflection of the side arm (3a). Thus, the floor stand (1b) can also be used in combination with sofas and beds that have no clearance underneath. Furthermore, the mast (3b) and the foot (3c) are constructed and connected to each other in ways that minimize the vibration that emanate from touching the screen of the device (2). The tray (4) with the torque hinge (6a) and the pivot joint (6b) is pivotably connected to the side arm (3a) directly or through means which allow the removal of the pivot joint (6b) and/or the torque hinge or hinges (6a) from the side arm reversibly. Furthermore, the tray (4) may be horizontally slidable on the side arm (3a).

When the portable stand (1) is a portable floor stand (1b), the side arm (3a) may hold one or more trays (4) of the same or different type and/or size. Furthermore—or alternatively, the side arm (3a) itself, and/or the stand (1b) beyond the side arm (3a), is comprising of at least one light, such as a further side arm with a light. The main purpose of this light(s) is to provide ambient light, and/or the light(s) may be used as a reading lamp together or independent of the device (2), e.g. by a person who is multitasking, e.g. following a football match on the device (2) while at the same time reading a conventional newspaper or book.

Is the stand (1) in the form of an integrated stand (1c), the piece of furniture i) may be a table, sofa, chair, bookstand, or a floor and/or task lamp; the piece of hospital equipment ii) may be a bed or the fixture of a medical apparatus; and/or the construction element of a building iii) may be a wall, in particular a wall adjacent to a bed or sofa. The base (3) may comprise a swivel arm, a pull-out arm and/or a tabletop. Thus, the integrated stand (1c) as a whole may not be portable. Hence, the term "portable" refers in this embodiment to the portable tray (4) with the fixation means (5) and optionally the torque joint or joints (6).

The base (3) as well as the side arm (3a), the mast (3b), and/or the foot (3c) of the base may be made of metal such as iron or aluminum; a metal alloy, such as steel or brass; carbon fiber; wood; and/or polymer or polymer composites. The skilled person is aware of suitable materials, which are commercially available, and he can make the best selection for specific needs.

The Tray (4) and the Fixation Means (5)

The tray (4) may be any tray which is suitable for the portable stand (1) according to the invention. Hence, the tray (4) of the stand (1) can be basically made of any material which can be properly processed. However, it is often preferred that the design of the tray (4) and the materials chosen are selected to result in a light but stable tray. Thus, in a preferred embodiment, the tray (4) is a metal tray; a tray made of natural materials, such as wood, ply wood, and/or MDF-sheet; and/or a tray made of synthetic material, such as polycarbonate, polyethylene, polypropylene, polystyrene, poly(meth)acrylate, polyvinylchloride, high pressure laminate (HPL), polyimide, carbon fiber, polymer foam, laminated polymer foam such as Dibond, which is a polymer foam laminated with an aluminum layer, and/or composite panels.

In a preferred embodiment, the tray (4) of the stand (1), in particular of the portable table stand (1a) and/or of the integrated stand (1c), may be an universal tray, i.e. devices of various sizes and makes can be used with it, and the tray is comprising of a multitude, i.e. 10 or more, preferably 30 or more, in particular 60 or more, of openings to fix the fixation means (5) to the tray (4) to adjust the position of the fixation means (5) for suitable electronic devices (2) to be attached to the tray (4), and/or the tray (4) is a dedicated tray for a device (2) of a specific make or size, in which case the positions of the fixation means may be fix and thus no openings may be needed.

In another preferred embodiment, the openings of the tray (4), which are suitable to fix the fixation means (5) to the tray (4), are in the form of oblong openings wherein the axis of the openings—within the tray (4)—are preferably arranged at an angle of 30° to 60°, in particular about a 45° angle, relative to the longest edge of the tray (4). These oblong openings allow the fixation of one or more device or devices (2) to the tray (4) at the optimal position. This arrangement results in a pattern of openings that allows the fixation means (5) to be placed on the tray (4) in such a way that the electrical ports, such as USB-ports and jacks, as well as the sidelong physical control buttons of the device or devices (2) remain accessible. Furthermore, the arrangement allows the positioning of the device or devices (2) in a way that the rear camera of the device or devices (2)—if available—is not covered by the tray (4) and thus can be used for making pictures or recording videos, when the device (2) is attached to the tray (4).

In one embodiment, the tray (4) may also comprise of a wireless charging unit for the device (2), which may be built into the tray (4). Alternatively, or in addition, the tray may also comprise jacks, e.g. USB-C, for power supply. Thus, the stand (1) may comprise electronic components and an electrical cable with a plug.

In a further embodiment—or in addition, one or more the torque joints (6) may be turned electrically, in which case they comprise an electrical drive mechanism, and the stand (1) as whole comprises a control unit.

In another, preferred embodiment, one or more electronic devices (2) can be attached to the tray (4), wherein the tray (4) has a length from about 5 to 50 cm, preferably from about 12 to 40 cm, and a height from about 5 to 40 cm, preferably from about 8 to 30 cm, and/or the electronic device or devices (2) have a weight of up to 2 kg, preferably up to 1 kg.

The device or devices (2) can be attached to the tray randomly according to the individual needs of the user. Hence, the lower edge of the device (2) may be justified with the lower edge of the tray (4). Alternatively, or in addition for another device (2), the upper edge of the device (2) may be above the upper edge of the tray (4), which is particularly of advantage when the rear camera of a device (2) shall be free for use. Depending on the position the rare camera, the device (2) may alternatively protrude the tray (4) sideways, in which case fixation means (5) may be needed along the upper edge of the device (2), and the device (2) is slid into the fixation means (5) sideways.

In even another preferred embodiment, the fixation means (5), when fixed to the tray (4), form together with the tray (4) a number of J-shape holders into which the electronic device (2) can be inserted reversibly. This allows for an easy and straight forward mounting and de-mounting of the device (2), for once the fixation means are positioned for a certain device or combination of devices (2), the device (2) can simply be slid in and out of the tray (4);

the fixation means (5), after the electronic device (2) has been inserted, may be, e.g. for safety reasons, fastened reversibly to tightly fix the device (2) to the tray (4). This provides a tight connection of the device (2) with the tray (4). Hence, even when the upper edge of the device (2) points downward, the device (2) cannot fall out. In addition, the fixation means (5) may be complemented with a locking-mechanism, which, if activated, may prevent unauthorized removal of the device (2) from the tray (4); and/or the fixation means (5) may comprise of a holder (a) and a fastener (5b).

The fixation means (5) may have different embodiments, which can be used in combination. Typically, fixation means (5) comprise of a holder (5a) and a fastener (5b), wherein the fastener (5b) fixes the holder (5a) to the tray (4). Alternatively, or in addition, the holder (5a) is mounted to or is an integral part of the tray (4) and/or the pivot part of the torque hinge(s) (6), in which case the holder (5a) is fixed by the tray (4) and/or the torque hinge (6a), so that no fastener (5b) is required. In yet another embodiment, the fixation means (5) are in such a form that they can be slid and fastened anywhere along the edge of the tray (4), thereby allowing for maximum utilization of the tray (4) and for optimal placement of the fixation means (5), especially along the lower edge of the tray (5) when more than one device (2) are mounted.

The fixation means (5), i.e. the holder (5a) and the optional fastener (5b), may be made of metal, of solid polymer material, and/or a renewable material such as wood. The holder (5a) is, if not part of the tray (4) or the torque joint or joints (6), most typically designed to be fixed within or through an opening in the tray (4). Thus, the holder (5a) may have threads, in which case the fasteners (5b) may comprise a threaded nut or wing-nut, or the corresponding thread/nut may be integrated in the tray (4) itself. Alternatively, the holder (5a) may have an even or a slightly knurled surface, in which case the fastener (5b) may be a clamp with which the holder (5a) can be fixed with an appropriate fastener from the rear side of the tray (4). If the fixation means (5) are of the kind that can be slid along the circumference of the tray (4), for instance along a groove milled into the tray, the holder (5a) may be pressed against the tray (4) with a stud screw or a spring-loaded mechanism or the like.

In another embodiment, the fixation means (5) are fixation means to fix the device (2) at numerous places along the edges of the tray (4), such as for instance clamps or clips. Hence, in this embodiment, the tray (4), if the tray is dedicated to a device of a specific size, does not require openings.

When on both sides of the tray (4) devices (2) are mounted, the fixation means (5) may be symmetrically to provide both sides of the tray (4) the same functionality of proper fixation of the device (2). Suitable fixation means (5), e.g. clamps, are known to the person in the art.

The Torque Joint (6), the Torque Hinge (6a) and the Pivot Joint (6b)

Torque joints, such as torque hinges, are—according to the present invention—joints that offer a torque, and thus a resistance, to the pivoting motion of what is attached to it.

The stand (1) according to the invention comprises one or more torque joints (6), wherein at least one torque joint (6) is in the form of a torque hinge (6a), i.e. hinge joint; ball joint, i.e. ball and socket joint; condyloid joint and/or saddle joint, thus allowing the tray (4) to be tilted by at least an angle of 30°, preferably at least 45°, starting from the 90° upwards position relative to the base (3, 3.1, 3c), and have a torque to allow the tray (4) with an attached electronic device (2) to remain in any position, and to tilt the tray (4) with the attached electronic device (2) by hand without having to loosen and tighten an adjustable screw or the like.

When the stand (1) comprises more than one torque joints (6), they may be i) all of the same type, i.e. all joints (6) may be torque hinges (6a), and/or ii) comprise of different types, e.g. a torque hinge (6a) and a pivot joint (6b). More than one torque hinge (6a) may be used to obtain a finely adjusted torque.

In a preferred embodiment, at least one further torque joint (6) is in the form of a pivot joint (6b), wherein the pivot joint (6b) is preferably connecting—directly, i.e. without a connector, or indirectly, i.e. with one or more connectors—the torque hinge or hinges (6a), the condyloid joint, and/or the saddle joint to the tray (4) or to the base (3) and thus allowing the electronic device or devices with a screen (2) to be rotated around a vertical axis, i.e. in a 90° angle relative to the base (3), preferably up to 360°. The pivot joint (6b) allows the user to set and fine-tune the lateral viewing angle when looking at and interacting with the device (2) without having to reposition the base (3). It turns only against a small torque, e.g. 0.15 Nm, to prevent the inadvertent rotation that would otherwise emanate from the device (2) when the touchscreen or control buttons of the device (2) are operated. If the device (2) is used for photographic recording, the torque hinge (6a) and the pivot joint (6b) allow the horizontal and vertical positioning of the camera at any angle, and they allow for the panning of the camera while the recording is in progress.

The torque joint (6) can be in the form of a torque insert, in which case it is inserted directly into the base (3) and/or the tray (4), and/or it is inserted into a carrier or connector with which it is attached to the base (3) and the tray (4). Alternatively, the torque joint (6) may have flaps or flags by means of which it can be attached to the base (3) and the tray (4) reversibly or non-reversibly. Furthermore, the torque joint (6) may be a spherical joint, i.e. ball joint, a longitudinal joint or some other mechanical element that can offer a resistance to the pivoting motion of the tray (4). Irrespective of the shape of the torque joint (6), the torque is either fix, e.g. 0.5 Nm, or the torque is adjustable within a certain range, e.g. with an Allen key or a screwdriver. The skilled person is aware of suitable torque joints (6), which are commercially available, and he has the skills for the best selection and assemblage.

In one embodiment, the torque joint (6) in the form of a torque hinge (6a) comprises—in particular consists of—a bolt with a nut, or of some other mechanical element that can hold the pivoting tray (4) in position, e.g. a ratchet-like contraption. This may allow the manufacturing of the stand (1) according to the invention with simple means which are readily available and may lower production costs.

When two or more torque joints (6) of the same type are present, in particular a number of torque hinges (6a), they are preferably placed next to each other in a row to form one or more joints to allow the tray (4) to be turned relative to the base (3).

When two or more torque joints (6) of different types are present, in particular one or more torque hinges (6a) and one pivot joint (6b), they may be placed next to each other, or they may be separated by one or more connectors.

The torque joint (6) of the stand (1) has a torque which allows the tray (4) with the attached electronic device or devices (2) i) to remain in any position, and ii) to tilt and optionally turn the tray (4) with the attached electronic device or devices (2) by hand—e.g. with one hand only—without having to loosen and tighten an adjustable screw or the like. Thereby, the torque joint (6) may consist of one or more torque joints (6), e.g. in the form of a number of torque hinges (6a). If e.g. more than one torque hinge (6a) is used, they may all have the same or all a different torque. It is, however, also possible that two or more torque hinges (6a) with one torque size and one or more torque hinges (6a) with another torque size are used.

In one preferred embodiment, the sum of the torques of the one or more torque joints (6) is between 0.1 and 10 Nm, preferably between 0.2 and 5 Nm, in particular between 0.3 and 3 Nm, measured according to ISO 16047:2005. Said torque numbers are typically attributed—at least to a larger extent—to the torque hinge or hinges (6a), ball joint, condyloid joint or joints and/or saddle joint or joints. The torque of the optional pivot joint (6b) is most preferably low, typically 0.05 Nm to 0.3 Nm, thus allowing an easy and smooth rotation, but still providing sufficient resistance to avoid unwanted rotation upon pressing a button or touching the screen of an electronic device (2), or to avoid jerky camera movement while panning and zooming.

Is the stand (1) a stand dedicated to smaller and/or light electronic devices (2), e.g. having a screen diagonal of about up to 10 inches, the torque may be in the range of about 0.1 to 1 Nm, in particular of about 0.3 to 0.8 Nm. And is the stand (1) a stand dedicated to larger and/or heavier electronic devices (2), e.g. having a screen of about 10 to 13 inches or larger, the torque may be in the range of about 0.5 to 10 Nm, in particular of about 1 to 5 Nm.

Suitable torque joints are known to the skilled person in the art and commercially available. The skilled person in the art knows how to make the proper selection of the type and number of the torque joints (6) and of the total torque for specific electronic devices (2). The use The portable stand (1) according to the present invention is preferably used by a person who is looking at and interacting with the screen of one or more electronic devices (2) from an angle below. In order to do this in a convenient manner, the screen is placed above the user and tilted into an overhanging position, which allows an optimal and relaxed use of the screen, e.g. at a viewing-distance of about 30 to 60 cm, depending on the length of the person's arms, viewing habits, eyesight, and the size of the screen. Hence, a particularly preferred use of the stand (1) is when a person is in a reclined, recumbent or supine position sitting and/or lying in an armchair, an armchair bag, a bean bag, on a sofa, a bed, a mattress, a deck-chair, a bench, a futon, in a bath tub, or on the floor.

In another embodiment, the portable stand (1) according to the invention can also be used as a holdfast and/or swivel appliance for the electronic device or devices (2) when making photographic images and/or film exposures with the camera of the electronic device (2) or devices. The torque joint or joints (6) of the stand (1) allow an easy, smooth, and exact positioning of the device (2) and thus of the camera, basically at any angle required, before and during recording. In short, the stand (1) can be used as a camera rig for tablet computers and smartphones.

The portable stand (1), is therefore most dedicated for the use in and around buildings. However, it is not suitable for use in vehicles or other movable objects when they are in motion.

In a preferred embodiment, the portable stand (1) is used as a portable table stand (1a), preferably with an integrated handle, wherein the portable table stand (1a) is preferably placed on a height-adjustable side-table, bed-side table, bed dining table, and/or over-bed table, which can preferably be positioned to extend over a bed. Such portable table stands (1a) are preferably used in private homes, hospitals, nursing homes, and/or rehabilitation clinics. It is important to notice that the ergonomics of this use case depends to a large extent on the difference between the height of the side-table and the height of the patient's bed. This difference should be within the range of roughly 30-60 cm; it can be achieved by adjusting either the height of the side-table, which often have only a manual lifting mechanism, or the height of the bed, which very often have an electromechanical lifting mechanism that is designed to be operated by the patient. This all has the advantage that the patient can height-adjust the table stand (1a) electrically even though the table stand itself (1a) lacks that functionality. In addition, the table stand (1a) is relatively small and can therefore easily be placed on and removed from the side table, e.g. by medical or health care personnel.

In another preferred embodiment, the portable stand (1) is used as a portable floor stand (1b). The portable floor stand (1b) combines the function of the portable table stand (1a) with e.g. a side-table, bed-side table, bed dining table, and/or over-bed table. Thus, the portable floor stand (1b) may be used when there is no adequate place to put a table stand (1a).

As such, the portable floor stand (1b) is preferably placed next to a person's body, and the side arm (3a), which may be height-adjustable, with the tray (4) and the device (2) can hover above the person's torso at a convenient distance. Furthermore, the tray (4) with the device (2) may optionally be slidable along the side arm (3a), and it is tiltable into a vertical or overhanging position in order that a person in a reclined, recumbent or supine position can view the screen of the device or devices (2)—and optionally interact with it conveniently from an angle below. Thus, a person may easily be sitting or lying—or be anywhere in-between—in an armchair, an armchair bag, a bean bag, on a sofa, a bed, a mattress, a deck-chair, a bench, a futon, in a bath tub, or on the floor. In this use case, it is important to notice that the side arm (3a) may be linked via a pivot joint (6b) to the vertical mast (3b) or the foot (3c) and thus may be rotatable around the axis of the mast (3b) by up to 360°. This allows the user to simply push the side arm (3a) with the tray (4) out of the way when, for instance, standing up from a sofa or when the device (2) is no longer needed—and to simply swivel it back into the exact same position when the use of the device is resumed. The foot (3c) is dimensioned to hold the floor stand (1b) in an upright position, irrespective of the deflection of the side arm (3a) relative to the foot (3c), which means that the floor stand (1b) can also be used in combination with sofas and beds that have no clearance underneath.

In even another preferred embodiment, the portable stand (1) is used as an integrated stand (1c), wherein the base (3) of the stand (1c) comprises preferably a swivel arm, a pull-out arm and/or a tabletop, wherein, when the stand (1c) is mounted or placed next to a person's body, so that the tray (4) and the device (2) can hover above the person's body and the tray (4) with the device (2) is tiltable, and optionally rotatable, into a vertical or overhanging position in order that a person in a reclined, recumbent, or supine position can view the screen of the device (2) easily from an angle below.

The portable stand (1), especially in the form of the table stand (1a), can surprisingly be used also in various other situations in which tablet stands which presuppose that the user is sitting in a hunched down posture right in front of a portable device clearly fail. However, the stand (1) according to the invention can be used widely and without said limitation. Thus, the stand (1) can be used in cases that demand a different angle of the screen: for instance if the device (2) is placed on the side of a desk/workplace and used only as a kind of 'second screen'; if two or more people need to look at the screen of the same device (2) simultaneously, for instance at presentation in business meetings or in a social situation in which several people watch a film or TV on the same device (2); if the device (2) is placed on a counter and the content of the screen should be visible to people from distance, for instance at trade shows or at exhibitions; and also when the device (2) is used for videoconferencing, especially if the camera has to record a small group of people and not only an individual.

In all its embodiments, the portable stand (1) can also be used as a camera rig for the cameras integrated in the portable electronic devices (2). The point here is not only that portable devices (2) can be mounted to the tray (4) so that their rear cameras remain unobstructed, and that the cameras can be tilted and rotated in all directions, but also that the stand (1) allows for true camera work as far as horizontal and vertical panning of the camera are concerned. Thanks to the torque joints (6), e.g. the torque hinge or hinges (6a) and the optional pivot joint (6b) the device (2)—and with it the front and the rear cameras—can be guided smoothly not only before but also during photographic recording. In the case of the floor stand (1b), there is also the side arm (3a) that can be rotated, which adds to the stand's (1) functional scope as a camera rig.

Particularly versatile as a camera rig is the table stand (1a) when it comprises for instance a small steel base (3). Due to its compactness, flexibility and the low center of gravity, it can easily and safely be placed for photographic recording or any other purpose: on a side-board, a cupboard, a kitchen counter, a chest of drawers, a coffee table, a flat armrest, a ledge or a window sill (even a narrow one), a book-shelf, a chair etc.

Example

A table stand (1a), i.e. a portable and tiltable stand (1), was assembled by connecting a 1.8 kg heavy base (3) made of steel and a dimension of about 270 mm×110 mm×8 mm to a tray (4) made of MDF with the dimension of 330 mm×150 mm×3 mm having a weight of about 0.12 kg with a multitude, i.e. 160, of oblong openings and 4 fixation means (5), with two torque joints (6) in the form of longitudinal torque hinges (6a), which are inserted into connectors that are attached to the tray (4) on the one side and the pivot joint (6b) on the other. Finally, the whole assembly is screwed to the base (3). The torque hinges (6a) consist of two torque inserts of 0.49 Nm and 0.735 Nm respectively. They are both of the type 'Hexatorq' from the Japanese manufacturer KATO and have, according to the technical specifications, a combined torque of 1.225 Nm. The pivot joint (6b) rotates against a torque of about 0.150 Nm.

A Microsoft Surface Pro 4 without keyboard, i.e. a device (2) with a weight of about 0.8 kg and a dimension of about 292 mm×201 mm×8.5 mm, is mounted in landscape orientation onto the tray (4) and positioned sufficiently close to the rotating axis of the torque hinges (6a) with the screen of the device (2) facing away from the base (3). The device was properly fixed with fixation means (5) made of polycarbonate.

The tray (4) with the device (2) can easily be tilted up to an angle of about 60°, measured from the 90° upward position relative to the base (3), which is the implemented stop position in this case. Due to the torque hinges (6a), the tray (4) and the device (2) are held safely in position at any angle within the tilting-range. The torque of the pivot joint (6b), too, turns out to be sufficient to prevent inadvertent rotation when the touchscreen is operated by a user.

A person laying in a bed or on a sofa can now look at the screen easily also upwards from lower positions. The stand can also be used in viewing situations in which the screen is looked at horizontally or conventionally from an angle above. The same tray (4) has also been tested successfully with two devices, a Samsung Galaxy Tab A and a Samsung smartphone, which together weigh less than the Microsoft Surface Pro 4.

LIST OF CITED REFERENCE SIGNS

1 Portable and tiltable stand (1)
1a Portable table stand (1a)
1b Portable floor stand (1b)
1c Integrated stand (1c)
2 Portable electronic devices with a screen (2)
3 Base (3) of the stand (1)
3.1 Flat base (3.1)
3.2 Weight (3.2)
3a Side arm (3a)
3b Mast (3b)
3c Foot (3c)
4 Tray (4) of the stand (1)
Fixation means (5)
5a Holder (5a)
5b Fastener (5b)
6 Torque joint or joints (6)
6a Torque hinge or hinges (6a)
6b Pivot joint or joints (6b)

Figure 1:
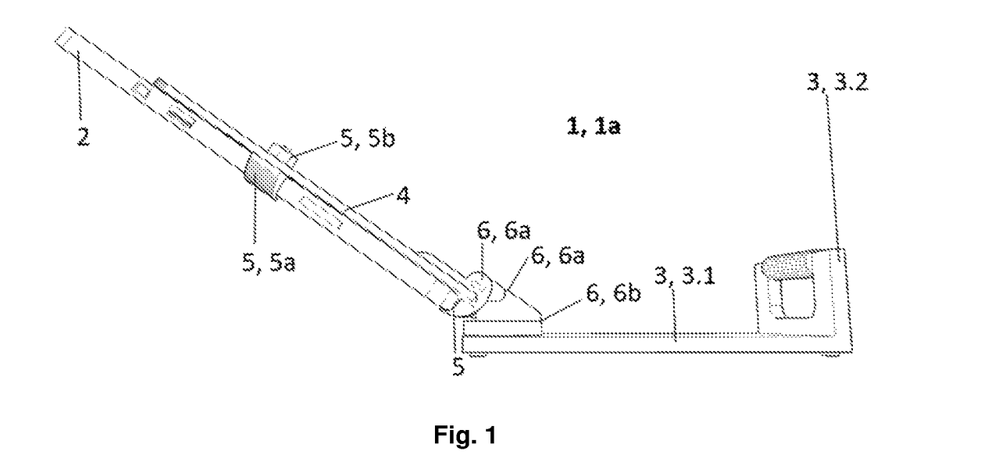
FIG. 1 shows a schematic side-view of the portable and tiltable stand (1) in the form of a portable table stand (1a) according to the present invention.

The following figures present non-limiting embodiments, which are not restricting or narrowing the invention. These explanations are part of the description:

FIG. 1 shows a schematic side-view of the portable and tiltable stand (1) in the form of a portable table stand (1a). It is comprising of a portable electronic device (2) in the form of a tablet computer. The stand (1) is comprising of the base (3), wherein the latter consists exemplarily of a flat base (3.1) and a weight (3.2) with an integrated handle. The tray (4) is linked to the base (3) via two torque joints (6) in the form of torque hinges (6a) and the optional pivot joint (6b). A number of fixation means (5, 5a, 5b) are fixed to the tray (4), wherein the device (2) can—once the fixation means are placed at the proper places—easily be slid into the J-shape holder (5a) of the fixation means (5).

The center of mass of the presented table stand (1a) is in or over the base (3) due to the weight (3.2), even when the tray (4) is in the position that exerts the largest momentum on the base (3), i.e. when the tray has its largest possible deflection against the base (3), and when an electronic device (2), i.e. the heaviest device (2) suitable for the stand (1), is attached to the tray (4).

The torque hinges (6a), here in the form of two torque inserts, are inserted into a connector and allow the tray (4) to be turned by at least an angle of ±30°, preferably at least ±45°, starting from the 90° position relative to the base (3). Furthermore, the properly selected torque-size of the torque hinges (6a) allow the tray (4) with the attached electronic device (2) to remain in any position, including in an overhanging position as shown. Thus, screen of the device (2) can be looked at also upwards from a lower position. Additionally, the tray (4) with the attached electronic device (2) can easily be tilted by hand without having to loosen and tighten an adjustable screw or the like.

The optional pivot joint (6b) allows the user to adjust the lateral viewing angle without having to move the base (3).

Figure 2:
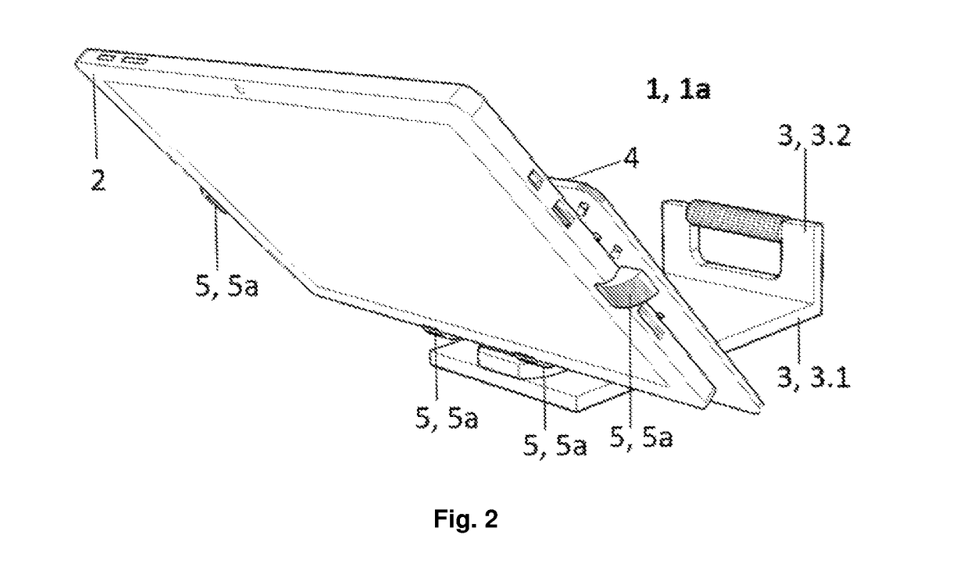
FIG. 2 shows the stand (1) with the device (2) of FIG. 1.

FIG. 2 shows the stand (1) with the device (2) of FIG. 1, wherein the stand (1, 1a) is turned horizontally by about 45°, allowing a better view of the screen of the device (2), a part of the oblong openings in the tray (4), as well as to the J-shaped holders (5a), i.e. the fixation means (5).

Figure 3:
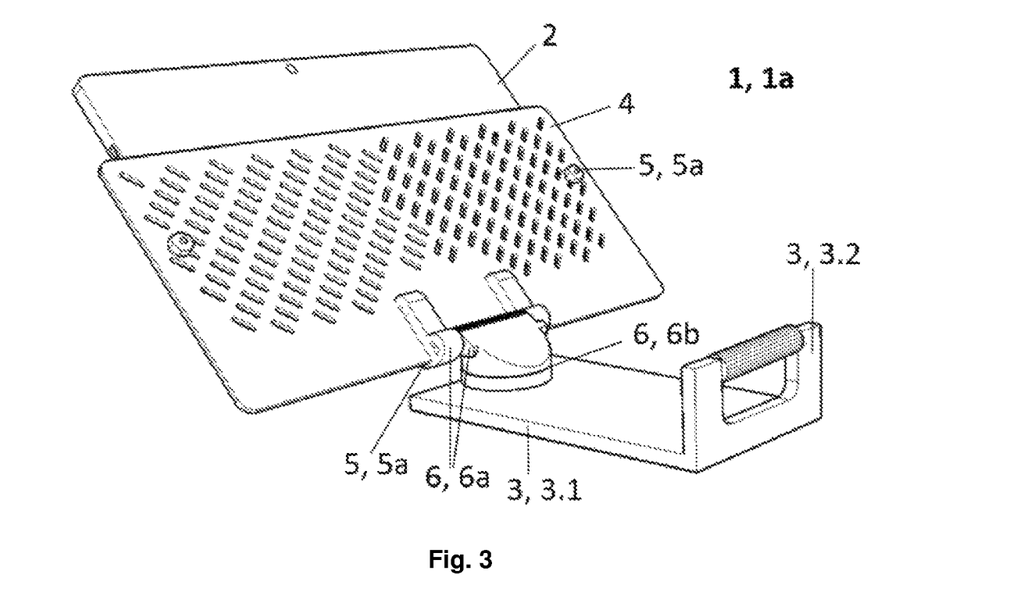
FIG. 3 shows the same stand (1) as shown in FIG. 1 and FIG. 2.

FIG. 3 shows the same stand (1) as shown in FIG. 1 and FIG. 2, wherein the stand (1, 1a) is shown from behind—in opposition to FIG. 2. The flat base (3.1) and the weight (3.2) may be two separate entities forming the base (3), or they may be, as it is the case here, in the form of a single unit. The torque joints (6), herein the form of 2 torque hinges (6a) and a 1 pivot joint (6b), link the base (3), i.e. in this embodiment the flat base (3.1), with the tray (4). The tray (4) comprises exemplarily two clusters of oblong openings, which are arranged in about a 45° angle relative to the longest, i.e. the upper horizontal, edge of the tray (4). This arrangement results in a pattern of openings that allows the device (2) and the fixation means (5) to be placed on the tray (4) in such a way that rear camera does not get obstructed and that the physical control buttons and the lateral electrical ports remain accessible, irrespective of the size and make of the device (2).

Figure 4:
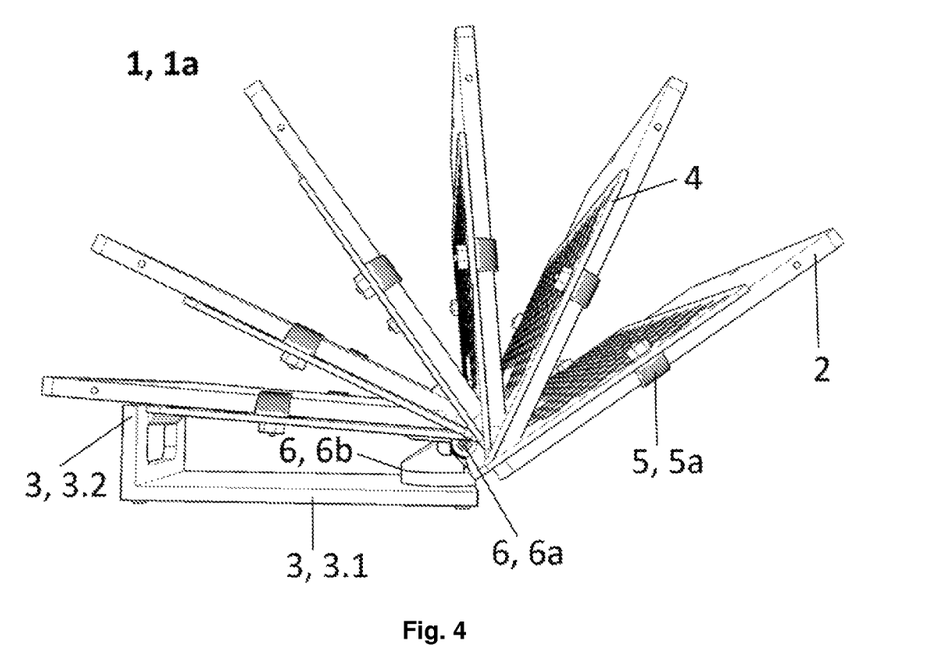
FIG. 4 shows a perspective view of the tilting-range of the same stand (1) as shown in FIG. 1, FIG. 2, and FIG. 3.

FIG. 4 shows a perspective view of the tilting-range of the same stand (1) as shown in FIG. 1, FIG. 2, and FIG. 3. For illustrative purposes, the tray (4) is tilted around the hinges (6a) at shown intervals of about 30°.

Figure 5:
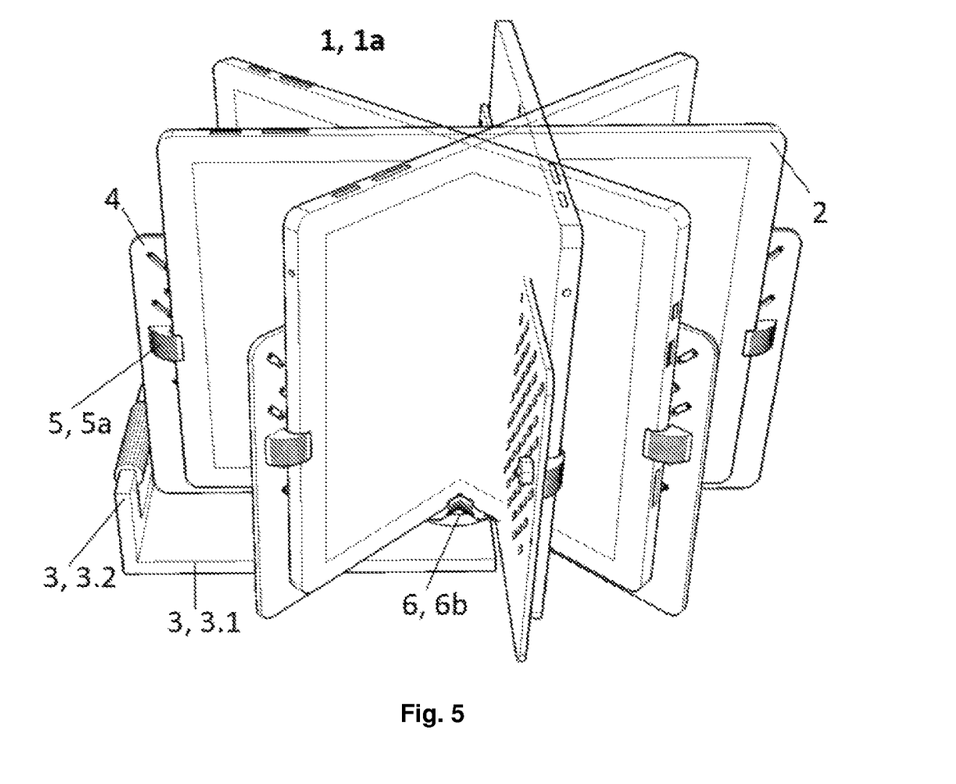
FIG. 5 shows a perspective view of the 360° pivot joint (6b) of the same stand (1) as shown in FIG. 1-4.

FIG. 5 shows a perspective view of the 360° pivot joint (6b) of the same stand (1) as shown in FIG. 1-4. The device (2) and the tray (4) are held by the torque hinge (6a) in a roughly vertical, i.e. 90°, position relative to the base (3) as it would be, for instance, for photographic recording with the rear camera. For illustrative purposes, the tray is rotated around the pivot joint (6b) at intervals of 45°.

Figure 6:
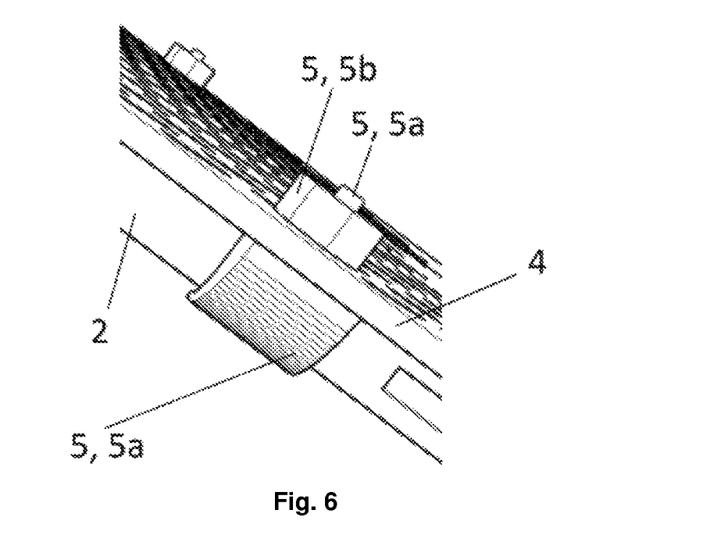
FIG. 6 shows a schematic, expanded view of the tray (4) with a fixation means (5) with the J-shaped holder (5a) and the fastener (5b) in the form of a threaded nut.

FIG. 6 shows a schematic, expanded view of the tray (4) with a fixation means (5) with the J-shaped holder (5a) and the fastener (5b) in the form of a threaded nut.

Figure 7:
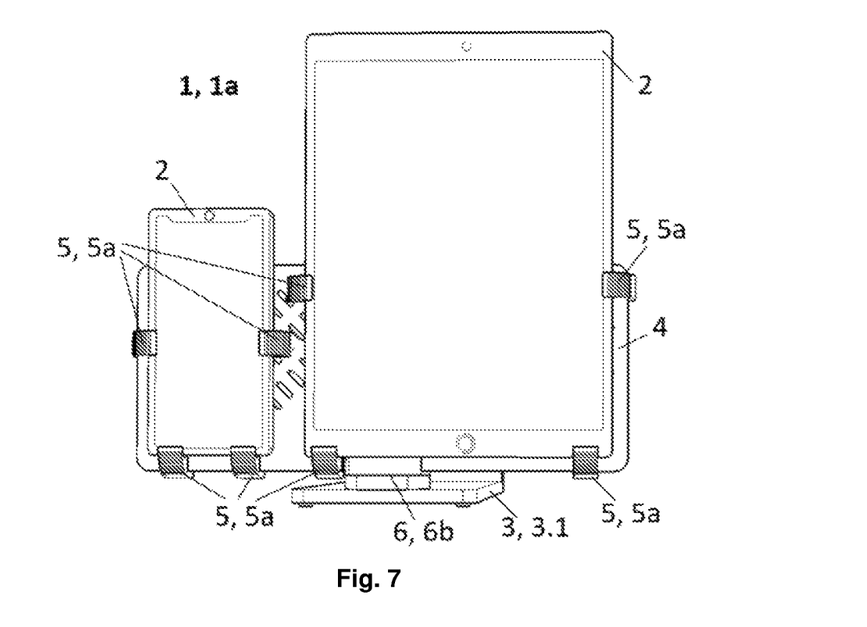
FIG. 7 shows a front view of the portable and tiltable table stand (1a) with two portable devices (2), a tablet computer and a smartphone, mounted to the tray (4)

FIG. 7 shows a front view of the portable and tiltable table stand (1a) with two portable devices (2), a tablet computer and a smartphone, mounted to the tray (4). The fixation means (5) placed along the edge of the tray (4) are of the type that can be slided and fastened anywhere along the edge of the tray (4), allowing for optimal placement.

Figure 8:
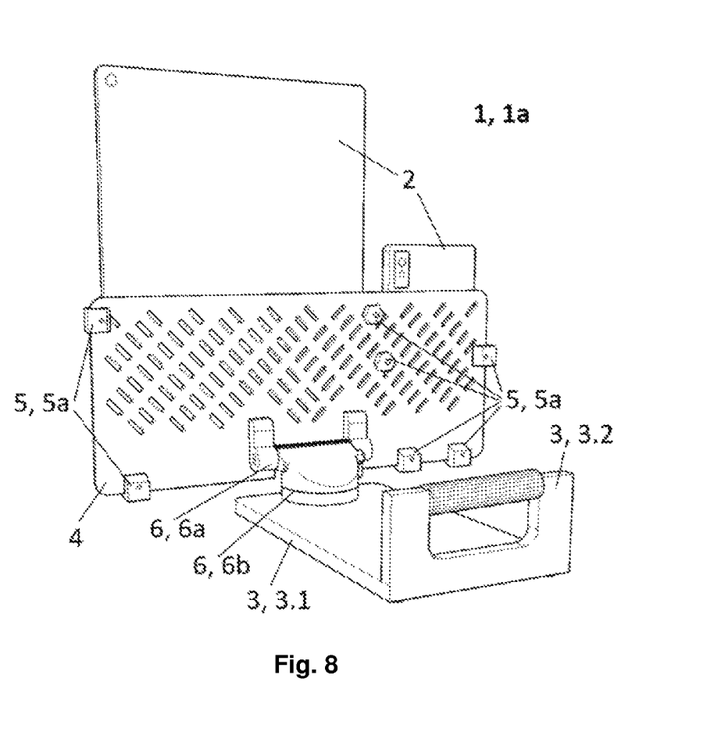
FIG. 8 shows a back view of the table stand (1.1a) as shown in FIG. 7.

FIG. 8 shows the same table stand (1.1a) as shown in FIG. 7 but from behind. Both devices (2) are mounted in such a way that the rear cameras remain unobstructed.

Figure 9:
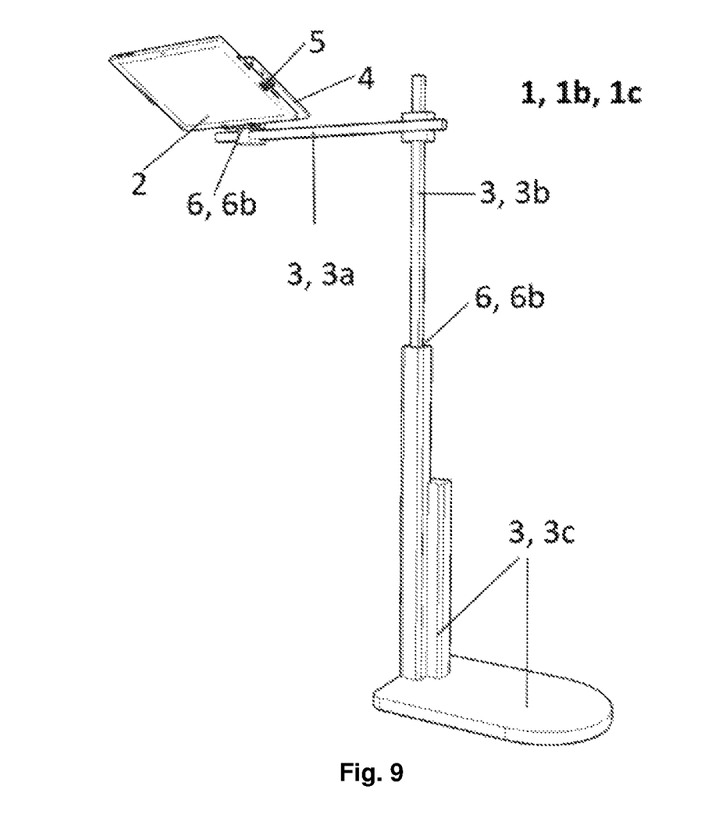
FIG. 9 shows a schematic side front view of the portable and tiltable floor stand (1,1b) comprising of the base (3) with the rotatable side arm (3a), the mast (3b) and the foot (3c)

FIG. 9 shows a schematic side front view of the portable and tiltable floor stand (1,1b) comprising of the base (3) with the rotatable side arm (3a), the mast (3b) and the foot (3c). The tray (4) is connected to the side arm via an assembly consisting of the torque joint (6), i.e. the torque hinges (6a) and the pivot joint (6b), and a connector that is slidable along the side arm (3a) horizontally.

The floor stand (1b) is also an integrated stand (1c) when the tray (4) can be detached from the base (3), i.e. the side arm (3a).

The side arm (3a) and the mast (3b) are rotatable around the vertical axis of the mast (3b) by 360° thanks to an additional pivot joint (6b) that connects the mast (3b) with the foot (3c). This build of the floor stand (1b) allows the user to simply push the side arm (3a) with the tray (4) out of the way when the device (2) is no longer needed—and to simply swivel it back into the exact same position when the use of the device is resumed. The foot (3c), here with a vertical shaft to support the mast (3b) and damp vibrations, is dimensioned to hold the floor stand (1b) in an upright position, irrespective of the deflection of the side arm (3a) relative to the foot (3c). Furthermore, the side arm (3a) can also be adjusted in height.

Due to the torque hinge or hinges (6a), the device (2) can, via the tray (4), be tilted, i.e. turned easily by at least an angle of ±30°, preferably at least ±45°, starting from the 90° upwards position relative to the base (3), i.e. the foot (3c). Furthermore, the device (2) can be rotated easily due the pivot joint (6b) arranged next to the torque hinge or hinges (6a). Hence, the portable floor stand (1b) can be placed conveniently over a person's bed, wherein the person can look at the screen easily also upwards from lower position.

Figure 10:
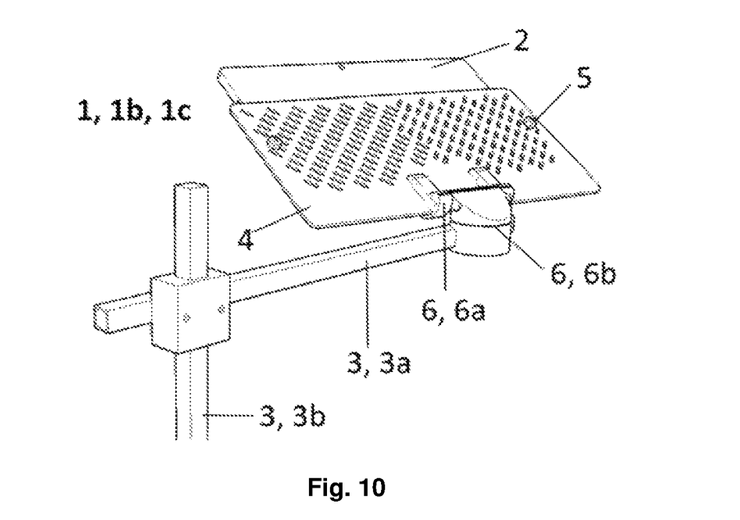
FIG. 10 shows a schematic expanded and rear side view of the portable and tiltable floor stand (1,1b).

FIG. 10 shows a schematic expanded and rear side view of the portable and tiltable floor stand (1,1b), which may be also an integrated stand (1c) in case the tray (4) can be detached from the side arm (3a), with the side arm (3a), the mast (3b), the tray (4), the torque joints (6), in the form of torque hinge or hinges (6a) and the pivot joint (6b), and a connector that allows the tray to be slid along the side arm (3a). The fixation means (5) comprise of the J-shaped holders (5a) and the fasteners (5b) hold the electronic device (2) properly.

The invention claimed is:

1. A portable and tiltable stand (1) with at least one portable electronic device having a screen (2), the stand (1) being in the form of a portable table stand (1a), the stand comprising:
   a base (3),
   a tray (4) with a fixation device (5), wherein each one of the at least one portable electronic devices is attached to the tray (4) reversibly,
   wherein the tray (4) is connected to the base (3) through one or more torque joints (6), wherein at least one torque joint (6) is in the form of a torque hinge (6a), ball joint, condyloid joint, or saddle joint, to allow the tray (4) to be tilted by at least an angle of ±30°, starting from a 90° upwards position relative to the base (3), wherein the tray (4) is placed in an overhanging position suitable for a person to view and interact with the screen from below, wherein a center of gravity of the portable electronic device (2) passes beyond the base (3), when the portable electronic device (2) is attached to the tray (4) with the fixation device (5) and when the tray (4) is tilted, wherein when the tray (4) is tilted back, the tray (4) is positioned over the base (3) of the stand (1), and wherein the torque joints (6) have a torque to allow to tilt the tray (4) with the attached portable electronic device (2) by hand without having to loosen and tighten an adjustable fastener, wherein a sum of the torques of the one or more torque joints (6) is between 0.1 and 10 Nm measured according to ISO 16047:2005.

2. The portable stand (1) according to claim 1, wherein
i) the center of mass of the portable table stand (1a) is in, below, or over the base (3), even when the tray (4) has its largest deflection against the base (3) and when the portable electronic device (2) is attached to the tray (4).

3. The portable stand (1) according to claim 1, wherein at least one further torque joint (6) is in the form of a pivot joint (6b), wherein the pivot joint (6b) connects the torque hinge (6a), the condyloid joint, or the saddle joint to the tray (4) or to the base (3) and thus allowing the portable electronic device or devices with a screen (2) to be rotated around a vertical axis up to 360°.

4. The portable stand (1) according to claim 1, wherein the tray (4) of the portable table stand (1a) comprises a plurality of openings to fix the fixation device (5) to the tray (4) to adjust the position of the fixation device (5) for suitable portable electronic devices to be attached to the tray (4).

5. The portable stand (1) according to claim 1, wherein the openings of the tray (4) are in the form of oblong openings, wherein the axis of the openings is arranged at an angle of 30° to 60° relative to a longest edge of the tray (4).

6. The portable stand (1) according to claim 1, wherein when the stand (1) is a portable table stand (1a),
the base (3) and the tray (4) are linked directly with each other through the one or more torque joints (6), or
the base (3) comprises a flat base (3.1) and a weight (3.2), wherein the flat base (3.1) and the weight (3.2) are two different elements forming the base (3) or the flat base (3.1) and the weight (3.2) are in the form of a single unit.

7. The portable stand (1) according to claim 1, wherein the tray (4) has a length from about 5 to 50 cm, and a height from about 5 to 40 cm, or the at least one portable electronic device has a weight of up to 2 kg.

8. The portable stand (1) according to claim 1, wherein the base (3) and the tray (4) are connected to each other non-detachably or detachably, wherein, when the tray (4) is detachable, the base (3) is i) a separate, portable base (3) or ii) is integrated in a piece of furniture, a piece of equipment, or a construction element of a building.

9. The portable stand (1) according to claim 1, wherein a sum of the torques of the one or more torque joints (6) is between 0.2 and 5 Nm measured according to ISO 16047: 2005.

10. The portable stand (1) according to claim 1, wherein:
the fixation device (5), when fixed to the tray (4), form together with the tray (4) a number of J-shape holders (5a) into which the portable electronic device (2) is reversibly inserted,
the fixation device (5), after the portable electronic device (2) is inserted, is reversibly fastened, to tightly fix the at least one portable electronic device (2) to the tray (4), or
the fixation device (5) comprises a J-shape holder (5a) and a fastener (5b).

11. A method for using the portable stand (1) according to claim 1 by a person who is looking at the screen of the portable electronic device or devices (2) from an angle below, the method including the step of:
tilting the tray (4) with the portable electronic device or devices (2) into an overhanging position, in particular when the person is in a reclined or supine position sitting/lying in an armchair, an armchair bag, a bean bag, on a sofa, a bed, a mattress, a deck-chair, a bench, a futon, in a bath tub, or on the floor.

12. The method according to claim 11, wherein the portable stand (1) is a portable table stand (1a), wherein the table stand (1a) is placed on a height-adjustable side-table, bed-side table, bed dining table, or over-bed table, which is positioned to extend over a bed.

\* \* \* \* \*